United States Patent [19]

Reitsma

[11] Patent Number: 4,622,585
[45] Date of Patent: Nov. 11, 1986

[54] COMPRESSION/DECOMPRESSION SYSTEM FOR TRANSMITTING AND RECEIVING COMPRESSED PICTURE INFORMATION ARRANGED IN ROWS AND COLUMNS OF PIXELS

[75] Inventor: Jogchum Reitsma, Apeldoorn, Netherlands

[73] Assignee: U.S. Philips Corporation, New York, N.Y.

[21] Appl. No.: 599,039

[22] Filed: Apr. 11, 1984

[30] Foreign Application Priority Data

Apr. 11, 1983 [NL] Netherlands .......................... 8301264

[51] Int. Cl.[4] ................................................ H04N 7/12
[52] U.S. Cl. ...................................... 358/135; 358/133; 358/260
[58] Field of Search ............... 358/133, 135, 136, 160, 358/260, 78; 382/56; 340/347 DD

[56] References Cited

U.S. PATENT DOCUMENTS

| | | | |
|---|---|---|---|
| 3,553,362 | 1/1971 | Mounts | 358/136 |
| 4,276,544 | 6/1981 | Iinuma | 358/133 X |
| 4,394,774 | 7/1983 | Wildergren et al. | 358/136 X |
| 4,420,771 | 12/1983 | Pirsch | 358/133 X |
| 4,485,402 | 11/1984 | Searby | 358/136 X |

OTHER PUBLICATIONS

CCITT Recommendation T4, Fascicle VII.2, pp. 3–17, sections 3.2–4.2.5 (Geneva 1980).

Primary Examiner—Howard W. Britton
Assistant Examiner—Victor R. Kostak
Attorney, Agent, or Firm—Thomas A. Briody; William J. Streeter

[57] ABSTRACT

In a system for the line-wise compression of binary data of a picture field, a first series of data bits of a current picture line and a second series of data bits of the directly preceding picture line are shifted together into a compression translator. A word of a line memory is read in a compression translator in order to obtain the data of the preceding line. At the same time the same word is written in to buffer the data of the current line. Compression bits are formed from the preceding and current line data. At the output of the compression translator the serial compression bits are regrouped in order to form words. Exclusive groups of significant compression bits are thus formed. During decompression a code word is read and a series of data bits is emulated and encoded as if it were the code word read. When the code word thus found corresponds to the code word read, a next code word is read and possibly a change of value for the data bits to be subsequently emulated is introduced.

12 Claims, 9 Drawing Figures

COMPRESSION/DECOMPRESSION SYSTEM FOR TRANSMITTING AND RECEIVING COMPRESSED PICTURE INFORMATION ARRANGED IN ROWS AND COLUMNS OF PIXELS

The invention relates to a system for the line-wise compression of binary data of a picture field in a compression device, said data being organized in rows and column, and for decompressing the data, after passage through a medium, in a decompression device in order to reorganize the data so as to form said picutre field. The system comprises a first input for said data and an input element for presenting a predetermined number of data bits in parallel to a compression translator in order to generate a series of compression bits per line on a first output of the compression translator. Systems of this kind are used for the transmission of facsimile information via a connection (line) or for the storage thereof in a storage medium. Compression and decompression can be performed together in a local computer system or local network. Compression and decompression can also be performed in separate stations. Finally, the storage medium may be formed by copying of a specimen medium, for example as a disc which is suitable for digital scanning. In that case the compression is only virtually present. A standard for the compression translation is described in CCITT Recommendation T4, Fascicle VII. 2, pp. 3–17, sections 3.2–4.2.5 (Geneva 1980) which is incorporated herein by way of reference. This standard is merely an example. The known standard aims to optimize the use of the transmission capacity of a connecting or to minimize the storage capacity required, for example for the filing of drawings. The present invention per se can also be used for other encoding conventions.

SUMMARY OF THE INVENTION

It is an object of the invention to further reduce the number of compression bits in comparison with said standard, so that less space is required for digital storage or less time is required for the transmission, thus increasing the processing speed even when use is made of simple means.

The object is achieved in accordance with the invention in that between the first input and the input element there is connected a word-wise organized read/write memory for acccommodating at least the binary data of a complete picture line, said input element comprising a first shift register with a parallel input and a parallel output for accommodating a first series of data bits of a current picture line during a memory operation. These data are stored in the read/write memory which is addressed by a first address. This first series is presented to the compression translator by shift control of the first shift register. The input element also compreses a second shift register with a parallel input and a parallel output for accommodating, during the same memory operation, a second series of data bits of corresponding columns on the directly preceding picture line from the read/write memory which is addressed by a second address. This second address occupies a fixed relative position with respect to the first address, and said second series is also presented to the compression translator by said shift control of the second shift register. The first output is serially operative in order to apply exclusively directly successive groups of significant compression bits per picture line to a series/parallel converting buffer. The buffer has a dynamic second input and a dynamic second output. The first input and second output are connected together to a communication bus whereto further data processing devices can be connected. The read/write memory ensures that the necessary data of the directly preceding line becomes available at the correct instant, the control of the read/write memory being simplified thanks to the fixed address distance during the read and write operations. A memory having a dynamic input/output is to be understood to mean a memory in which a free word location is always available during a write operation, unless the capacity of the memory has been completely utilized. During a read operation, a word is always immediately available, unless the memory is completely empty. Examples in this respect are first-in-first-out memories having a "fall-throug" facility. Another example is a random access memory with automatically circulating read addresses and write addresses. In that case given steps are taken to ensure that the read address cannot pass the write address (nonsense data would then be read) and also that the write address cannot pass the read address, because valuable information could then be lost by erasure. The use of exclusively significant compression bits within a line increases the efficiency. In accordance with the known technique, lines containing few significant transitions between black and white are filled with fill bits (section 4.1.3, op. cit) in order to prevent a picture line from containing an insufficient number of compression bits. In accordance with the described set-up, the drawback of non-significant compression bits is eliminated, i.e. the required transmission capacity is limited. Finally, thanks to the parallel-wise presentation of two series of data bits of the current line as well as the immediately preceding line, a substantially simplified logic processing structure is obtained. The connection of various parts to the communication bus increases the flexibilty, so that, for example any residual space in the read/write memory can be used for other data processing purposes. Moreover known direct memory access principles may be used.

Preferably, the compression bits are organized in bit groups which each, time group-wise, indicate a transition between black and white, such significant bit groups being directly successive within a picture line and between successive lines of a picture. The efficiency is thus further enhanced, because the end-of-line bits (section 4.1.2, op. cit) are thus also suppressed. In this manner a complete page is compressed without using interjection bits.

Preferably, for the processing of the first line of the picture field a one-colour fiduciary zeroth line is presented to the compression translator. The organization of the device is thus simplified, because the first line is treated in the same way as all subsequent lines; the zeroth line is fiduciary and is not treated at all.

The invention also relates to a compression device for use in a system of the described kind in which said parallel inputs are also connected to the communication bus, said first and said second address being the same in that said memory operation is a read-before-write operation controlled by a direct memory access (DMA) unit. Such a memory cycle can be very quickly executed.

Preferably, there is provided a sequential logic element which has at least two stages in order to activate said shift control in a first state until a group of significant compression bits has been formed, to deactivate in reaction thereto said shift control in a second state, to activate said first output until said group of significant compression bits has been presented completely on said output, and to reactivate in reaction thereto said first state.

Preferably, said compression translator comprises a programmable logic array, under the control of at least two pairs of data bits (x, x−1, y, y−1) which are situated in an elementary square in the picture and, moreover, additional data bits (BY−2, BY−3, BY−4) of the directly preceding. The programmable logic array forms transition-dependent line status signals (LST 0:3) in first logic sub-elements, a sequencer for horizontal code status signals (HST 0:2) in second logic sub-elements from line status signals by means of an end-around coupled hold element. The code bits and the output signals of the sequential logic element are formed in third logic sub-elements from line status signals, horizontal code status signals and code word rest length signals (C∅DL 0:3) code word rest length signals are produced by a counter. Such programmable logic elements represent economical modules.

Preferably, said second state has a sub-state in order to enable, together with the presentation of a last code bit of a group of significant compression bits, the shift control of the next data bit. The coincidence in time of the presentation of a code bit and the reception of a new data bit results in faster processing.

Preferably, code word rest length signals are formed by means of code word rest length signals (HC∅DL 0:3), applied to the code word rest length counter via a multiplexer, or line status signal (LST 0:2). The code word rest length counter comprises at least one position for advancing the compression translator while outputting a fill bit within the relevant code word. It has been found that code words beyond a given length usually start with a series of zeros. In this case the zeros are not formed by a code word generator, but in an indirect manner in that during the counting down of the code word rest length no bit is output which is generated by the code word generator itself. The construction of the code word generator is thus simplified.

The invention also relates to a scanning device for a document, comprising a compression device and also a picture buffer which is fed by the scanning element in order to accommodate all data of a picture field before further processing. Such a scanning device can act, for example as a stand-alone data source for a data connection or for the local filing of arbitrary documents (text, drawings), for example on a digital optical recording (DOR) disc.

Preferably, in a system of the described kind the decompression device comprises a third input for the compression bits. A second, word-wise organized read/write memory for accommodating at least the binary data of a complete picture line is connected with a third shift register with a parallel input and a parallel output for storing, during a second memory operation, a third series of data bits of a directly preceding picture line from the second read/write memory which is addressed by a third address. This second series, is presented by way of a second shift control of the third shift register, to a decompression translator. A third output of the decompression translator is connected to the series input of a fourth shift register in order to present thereto a series of data bits of a current picture line, and to present this series to the decompression translator again on an output of the fourth shift register. The fourth shift register also comprises a parallel output for writing, during said second memory operation, a fourth series of data bits of the current picture line back into the second read/write memory which is addressed by a fourth address which occupies a fixed relative position with respect to the third address. There is also provided a code word recognizer which comprises a parallel/series converting input element and an end-around coupled sequencer for signalling the recognition of a code word to the decompression translator. Also, there also provided is a second sequential logic element which comprises at least two states in order to activate said parallel/series converting input element in a third state until a code word has been recognized and to activate said second shift control in a fourth state in reaction thereto until a series of data bits which is in agreement with the group of significant compression bits of the code word thus recognized has been presented to said fourth shift register. Thus, a series of data bits is emulated until a series corresponding to the current code word has been issued. The next code word restarts the procedure. In many cases substantial parts of the compression device and the decompression device may have the same construction; even dual use is possible.

The invention also relates to a decompression device for use in a system of the described kind in which there is provided a counting element for counting the data bits presented to said fourth shift register after the recognition of a horizontal code, and a comparison element for comparing the counting sum with a counting sum of a "make-up" or a "terminate" code wird which is translated by the code word recognizer from a horizontal code word upon recognition thereof. This results in simple bookkeeping for the emulation.

Preferably, said fourth shift register has a first-in-first-out organization, the parallel output thereof being connected to a second communication bus, together with the second read/write memory. The internal data transport is thus simplified.

BRIEF DESCRIPTION OF THE FIGURES:

The invention will be described in detail hereinafter with reference to some Figures.

Figure 1:
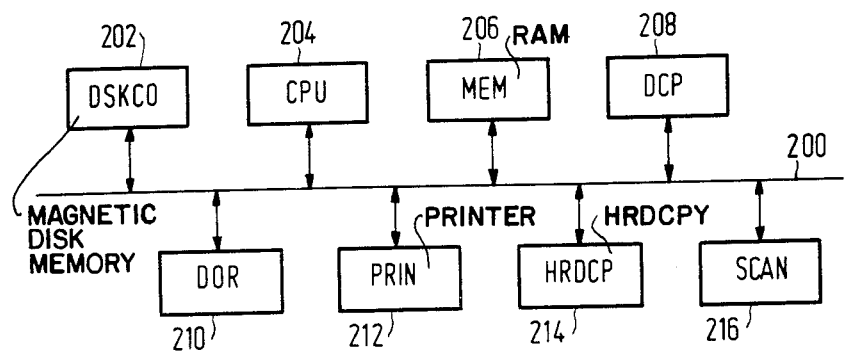
FIG. 1 shows a computer system in which the invention is implemented.

USE OF THE INVENTION:

FIG. 1 shows a computer system implementing the invention. The central component is formed by a general purpose bus 200. A number of sub-systems 202–216 are connected thereto. Block 202 symbolizes a magnetic disc memory, including the required control unit which performs the control operations such as sector addressing and formatting of the data. Block 204 symbolizes a central processor unit. Block 206 symbolizes a so-called random access read/write main memory. Block 208 symbolizes a data communication processor for the connection of a keyboard, data communicaton link and/or visual display element such as a cathode ray tube. Block 210 symbolizes a write/reproduction unit for digital optical storage, including the required control unit which performs the control operations and data formatting/buffering. Block 212 symbolizes a printer, for example an ink jet printer. Block 214 symbolizes a unit for so-called "hard copies". This unit is capable of making a 1:1 copy of a form or drawing without requiring any advance knowledge of its data contents. Block 216 symbolizes an optical scanning device for a document which is line-wise scanned. The scanning device usually comprises a picture memory for the intermediate storage of the complete data scanned. After scanning or storage, a compression translation takes place or not as will be described hereinafter. When compression has taken place, a decompression operation must be performed in unit 214 in in order to obtain a 1:1 copy; the same is necessary for visual display on a cathode ray tube. In the latter case, because of the repeated picture refreshment, usually a picture memory is also provided.

DESCRIPTION OF A PREFERRED EMBODIMENT

Figure 2:
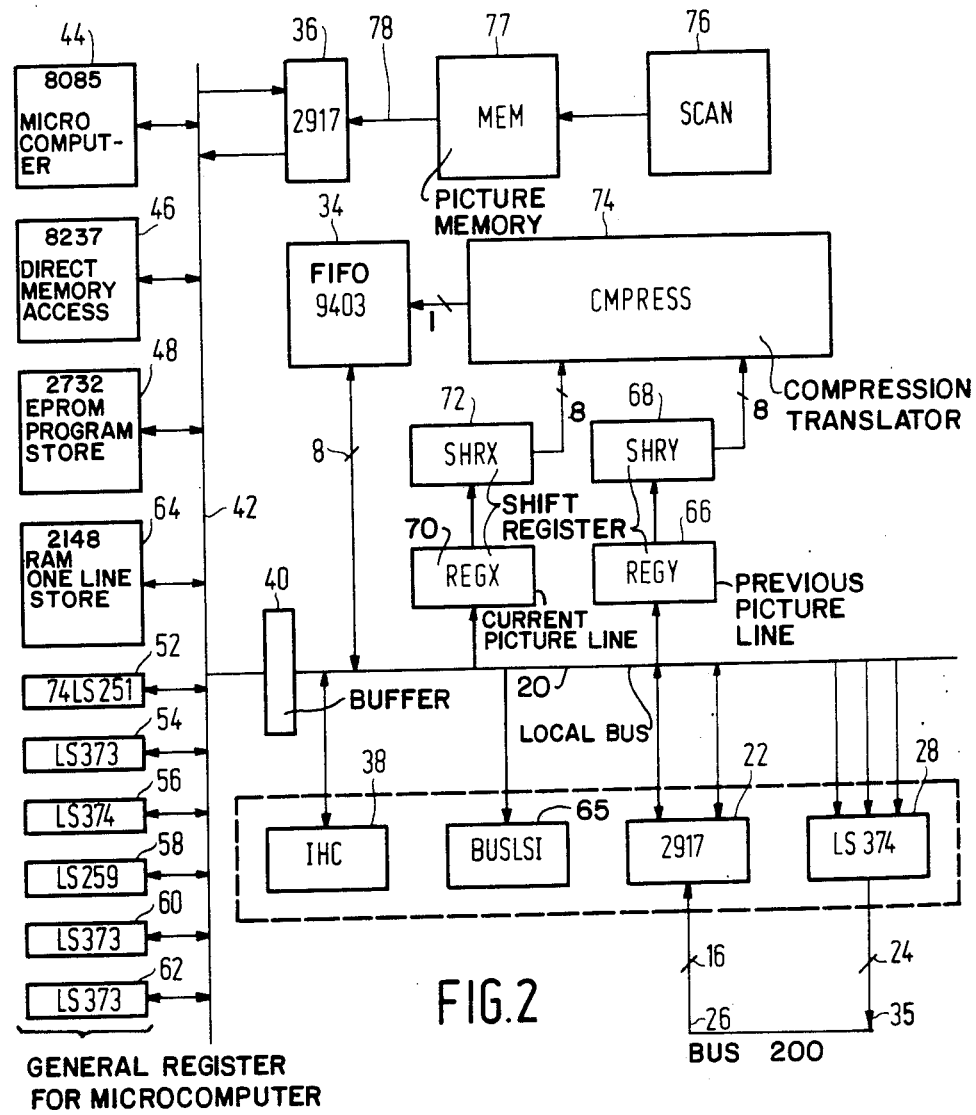
FIG. 2 shows a block diagram of the compression translator and its direct environment.

FIG. 2 shows a block diagram of a compression translator and its direct environment. Line 20 represents a local bus having a data path width of 8 bits, said bus also comprising a number of control lines (omitted for the sake of simplicity). Via units 22, 28, the bus is connected to the general purpose bus 200 of FIG. 1. Block 22 consists of four modules of the type ADM (American Micro Devices) 2917 which are four-bit wide bidirectional buffers for connection to th 16-bit wide data bus 26. Block 28 consists of three modules of the type TEXAS INSTRUMENTS LS 374 from the known series of TTL modules which are eight-bit wide unidirectional buffers for connection to the 24-but wide address bus 35. The buses 26, 35 form, together with control lines which have been omitted for the sake of simplicity, the general purpose bus 200 of FIG. 1, so that the bus 20 is capable of communicating addresses as well as data with the bus 200. Element 34 is a first-in-first-out (FIFO) buffer which is composed of two modules of the type FAIRCHILD 9403 having a parallel-connected output and a storage capacity of 168 bits. Element 36 is a bidirectional buffer of the same type as the element 22, but has a data path width of 8 bits for connection to an external line 78 whereto the actual scanning device 76 is connected via the picture memory 77 whose capacity suffices for a complete binarized picture. Additional control lines have been omitted for the sake of simplicity. When a signal "start read" is received, a complete picture is line-wise scanned and buffered. The data is subsequently output byte-by-byte via bus 42. Element 38 is a circuit for the processing of interrupt signals which arrive, for example via the control section (not shown) of the computer bus 200. Element 40 is an element for bilateral signal matching, type 8304T, make INEL. This element ensures that the output stages of the various elements "see" the correct impedance. Element 64 is a bus control circuit, for example as described in the previous Netherlands Patent Application 8202060 in the name of Applicant which is incorporated herein by way of reference. Block 44 represents a microcomputer of the type INEL 8085. Block 46 represents a circuit for direct memory access (DMA) of the type INTEL 8237. This circuit controls the exchange of data between the picture memory 77 and the registers 70, 66, to be described hereinafter, and the read/write memory 50 on the one side and between the first-in-first-out memory 34 and the buffer 22 on the other side. Block 48 represents an electrically programmable read-only memory (EPROM) of the type INTEL 2732 for the storage of the program of the microcomputer 44. Block 64 represents a random acess read/write memory type INTEL 2148 for the storage of the data of one picture line (1728 bits=216 bytes), for intermediate data for the microcomptuer, etc. For the processing of a new picture, the part of the memory which acts as the picture line buffer is reset to zero. For the treatment of the first picture line, this resetting to zero has the effect as if a one-colour zeroth lines has been fiduciarily formed (this line is then preferably completely white). The total capacity of the memory is 1k×8 bits. The blocks 52–62 represent six 8-bit registers of said series of TTL modules. The registers are partly general register for microcomputer 44 and partly registers especially intended for the compression translation. Block 70 represents an 8-bit register for the next byte of data bits of the current picture line. Block 66 represents a similar 8-bit register for the corresponding byte of data bits of the directly preceding picture line. Corresponding is to be understood to mean herein that the relevant pixels are situated pairwise above one another. Block 72 represents a 16-bit shift register having an 8-bit wide input and an 8-bit wide output. The input is connected to the register 70 and the output is connectd to the compression translator 74. Block 68 represents a similar shift register for the directly preceding picture line. Therefore the data, comprising each time 2×8 bits, is available for processing in the compression translator 74. Actually, a limited selection therefrom also takes place. The output from the compression translator 74 to the FIFO-buffer 34 has a width of 1 bit.

THE ORGANIZATION OF THE COMPRESSION

A picture is generally organized according to the DIN A4 format. There are 2287 lines per picture and 1728 pixels (216 bytes) per line. The coding diagram is analogous to said CCITT standard, with the following modifications:

a. 2-dimensional compression also takes place on the first line, there being assumed a fiduciary zeroth line which completely consists of "zeros".

b. Fill bits and EØL end-of-line-bits are not generated.

c. An encoded page is suplemented by at least 8 "zeros".

d. All lines are 2D encoded (so the standard-defined constant $K=\sim$).

e. The average period of time required for the encoding of a picture is 1 s.

f. The encoded data is transferred to the main memory (206), possibly via data chaining. The latter technique is described in the previous Netherlands Patent Application 8103895 in the name of Applicant which is incorporated herein by way of reference.

g. The non-coded data, originating from the scanning device, is completely buffered in a picture memory before being encoded, so that no real rush situations occur in the compression hardware.

This picture memory has a conventional construction and a capacity of at least 3.96 Mbits.

The control unit for the picture scanning device (FIG. 2, elements 44 to 64) comprises all components for the reading, interpretation and execution of commands from CPU 204 which are prepared in the memory 206. The most important command is the command "SCAN". During the execution of this command, the picture scanning device 76 receives (secondary) commands so that a picture is scanned and the data is stored in the picture memory 77. This data is ready byte-by-byte by the control unit in order to be presented to the compression translator 74. The latter encodes the data bits and shifts the code bits serially into the FIFO 34 in order to reorganize the bits so as to form new bytes. This reorganization is of importance only for the transport on the 8-bit wide data bus 20/42, but in no way modifies the data contents. Under the control of the DMA unit 46 the code data organized in bytes is subsequently fetched from the FIFO 34 and stored in intermediate registers wherefrom this code data is applied to the memory MEM 206. The relevant address is also supplied by the DMA unit. The commands issued by the program are interpreted by the microcomputer 44 which also controls the compression translator 74 and the DMA unit 46. The microprogram is stored in the unit 48. The memory 64 is used as a line buffer (1728) bits, as a working space for the microcomputer 44, and for the formation of stack registers.

DESCRIPTION OF THE COMPRESSION TRANSLATOR

The compression translator consists of the following functional sections:

(1) an input section;

(2) a section which detects whether a code can be generated and if so, whether a horizontal code or a vertical code is required; in the case of a vertical code, it also determines which vertical code is required;

(3) a section in which th run length is determined for horizontal codes;

(4) a section which translates the horizontal run length into a horizontal code and which also converts this code into serial data for the input of the FIF∅ 34 (horizontal code generator);

(5) the FIF∅ in which the data is rendered parallel and buffered. During a cycle of the DMA unit, an octade of the directly preceding line (y-line) is applied from the RAM 64 to the register 66 in the input section and, moreover, an octade already prepared in the picture memory is transferred to the RAM 64 (to the address just read) and to the register 70. When an empty space having a length of 8-bits has been created in the shift registers 72, 68, the registers 70, 66 are emptied (and sebsequently filled again under the control of the DMA unit). A forward-counting counter updates the received number of shift pulses of the shift registers, so that its count indicates the number of empty shift register positions at the input side. When this number amounts to eight, a new octade must be transferred. Moreover, in a given position of the counter the DMA unit is enabled to execute a next cycle.

The next section comprises the decoding of the contents of the x and y shift registers in order to detect whether or not it is necessary to form a code word (the code words have a variable bit length), that is to say when a black/white transition occurs on the current (x) picture line or when a so-called b2 black/white transition occurs on the direcly preceding (y) picture line. Three cases can be distinguished:

(a) there is a transition on the current line and no transition on the directly preceding picture line, taken in the range between ±3 bits along the line. In this case a first programmable logic array (FPLA) produces a code 0100 when the signals LST (0:3) occur. These signals are applied to a second and a third FPLA in which they look after the generating of a "horizontal code";

(b) a transition occurs on the current line and also a so-called b1 transition in the range between ±3 bit positions on the directly preceding line. In this case the first FPLA indicates that a vertical code is to be generated: the bits LST (3:0) indicate, in inverted form, the length of the relevant code word; the bits LST (2:0) are loaded, via a multiplexer, into a counter (vertical code words have a length of between one and seven bits). This counter counts up to the position 15 and, by way of the third FPLA, a code bit is formed every counter pulse by means of the bits LST (3, 1, 0), C∅D (3:0) and B1. Bit B1 indicates whether a b1 bit has occured on the y-line preceding the transition on the x-line, and is formed by the second FPLA;

(c) there is no transition on the current picture line, but there is a "b2" transition on the directly preceding picture line, which means that the signal B1 already has the value "1". This is so-called "PASS" mode. The treatment is the same as in the case of b1.

For a horizontal code, the transition-less distance (run length) is determined by means of three counters having the content RUNL (A:0). For each shift pulse on the two input shift registers, this counter triade is incremented; the counter is loaded with the value "1" exclusively at the first shift pulse after the formation of a code word. Before the beginning of a line, the counter triade is set to the position "0" because sometimes a dummy run length "white" having the effective length zero is to be generated.

In order to generate the code, the most-significant part of a run length RUNL (A:6) must be used for a so-called "make-up" code and the least-significant part of RUNL (5:0) for a so-called "terminate" code. The selection between the two parts of the run length is performed by means of a multiplexer.

Three programmable read-only memories (PROM) are used to generate the horizontal code words. The signal STERM makes a selection between the formation of a terminate code and a make-up code. The black/white value of the signal (x−1) (directly preceding current bit) provides the selection between a white line segment and a black line segment. The first two PROM memories output the significant parts of the code word and the last PROM memory outputs the length of the code word in inverted form or, including any non-significant parts: the leading zero bits. The code word is aligned at the left on the PROM outputs (H∅RC 0:7).

The code is subsequently loaded into a shift register and is serially shifted out. The shifted-out signal is applied to the serial input of a FIFO buffer via an FPLA unit. The code length is applied, as in the case of a vertical code, to a counter via a multiplexer. This counter counts the code bits until it reaches its final position again. When the code word comprises more than 8 bits, only the last eight bits originate from the relevant PROM memory; at its leading end one or more zeros are suppled under the control of an FPLA unit which renders the signal CØDE zero for as long as the signal CØDL (3:0) has a value smaller than 8. Moreover, the data HØRC is not yet shifted for the time being. Shifting takes place only when the value of CØDL equals at least 8. The data HØRC is then also shifted and the CØDE bits obtain the value HØRCS 1.

DESCRIPTION OF THE TIMING DIAGRAMS

Figure 3:
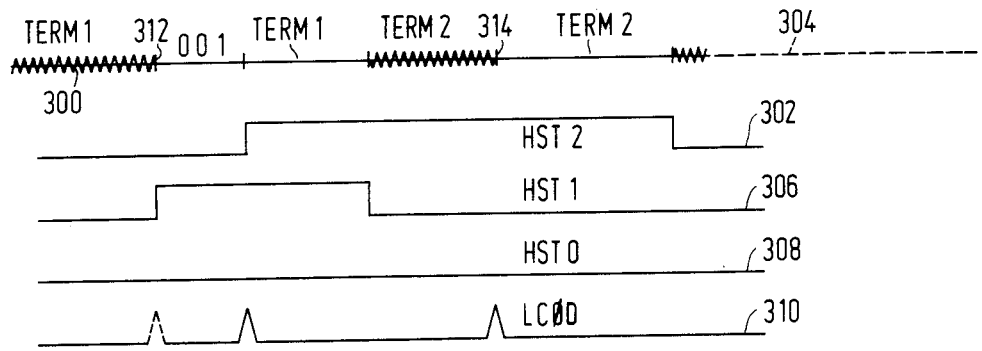
FIGS. 3, 4 show some examples of signal diagrams.

FIG. 3 shows a first timing diagram for the formation of a horizontal code, that is to say a code which does not require a "make-up" code. An indication as given, for example at 300, indicates that data bits arrive. At indication 312 it is detected that a code word is to be formed: a pulse appears on the signal LCØD (line 310) and the signal HST1 (line 306) becomes high. Under the control of the signal LCØD, the data HØRC is then loaded into the code register (elements 134/138). Whenever the signal LCØD is denoted by a dotted line, it has no "real" effect, because the code is then issued in that first a bit group "001" is formed. As from indication 312, the shifting in the data register stops and the outputting of the series of code bits commences. When an initial bit group has been issued, a pulse again appears on the signal LCØD and the signal HST2 (line 302) becomes high. When the terminal code TERM 1 has been output, the signal HST1 becomes low. The output of the code bit series subsequently stops and the shifting of the data bits is resumed. Each time two horizontal codes are generated in succession. Subsequently, either a next pair of horizontal code words or a vertical code word can be generated. When it is detected that again a code word (the second) is to be formed, a pulse appears again on the signal LCØD and a shifting of the data bits stops in order to enable the output of a series of code bits. When this has taken place (without initial bit group 001), the signal HST2 becomes low and the initial situation has been restored.

Figure 4:
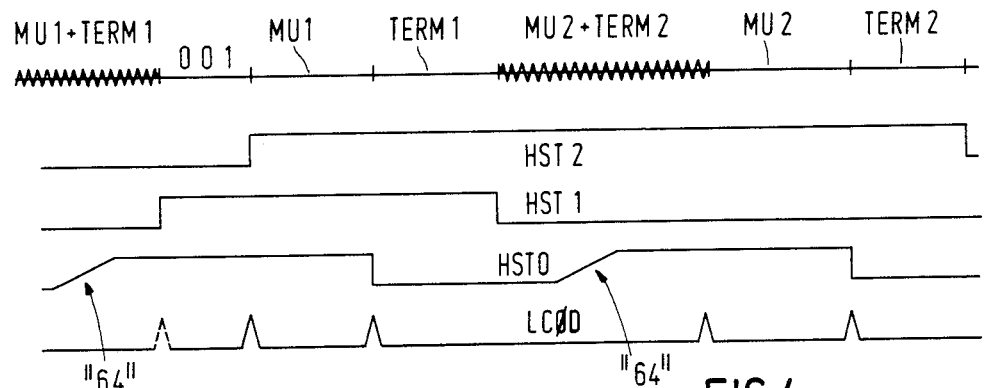

Like FIG. 3, FIG. 4 shows a timing diagram concerning the formation of a pair of directly successive horizontal codes which in this case consist of a combination of "make-up code" and "terminate code" because of the large number of successive equivalent data bits. This is indicated by the fact that, during the reception of a series of data bits, the signal HSTO becomes high at the instant at which the limit length (63 bits) is exceeded. The oblique edge indicates that this change of the signal HSTO need not direcly have consequences because before the formation of the make-up code first the total series length must be known. At the end of a make-up code, a pulse appears on the signal LCØD and the signal HSTO becomes low again. Subsequently the terminate code is output. It may also occur that one of two succesiive run lengths necessitates a make-up code, while the other does not.

The "vertical" cases are processed in the same manner as the horizontal codes, be it with some exceptions. First of all they are not pair-wise generated. Furthermore, a make-up code is never necessary. Thirdly, for the so-called "PASS" mode only a code "0001" is formed. In these cases the signals HST (0:2) always have the value zero.

DETAILED DESCRIPTION OF A COMPRESSION TRANSLATOR

Figure 5A:
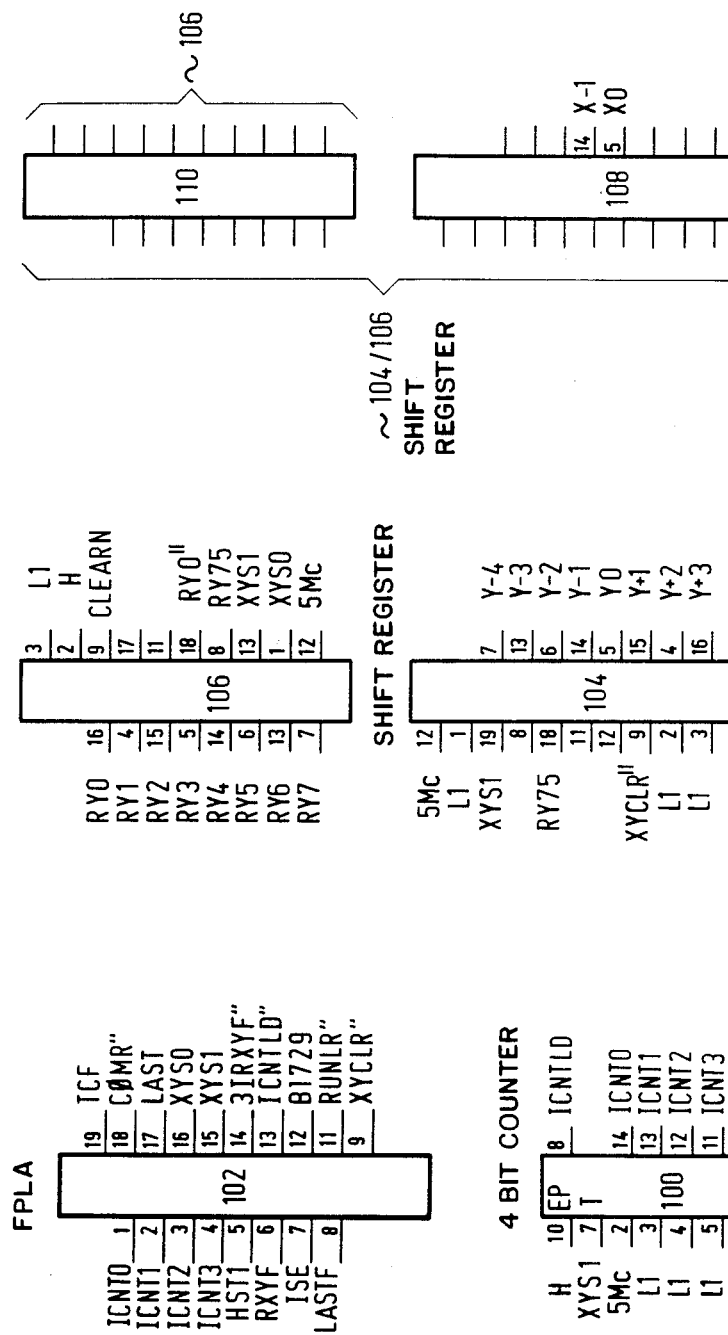
FIGS. 5, 6 show a detailed block diagram of a compression translator.
Figure 5B:
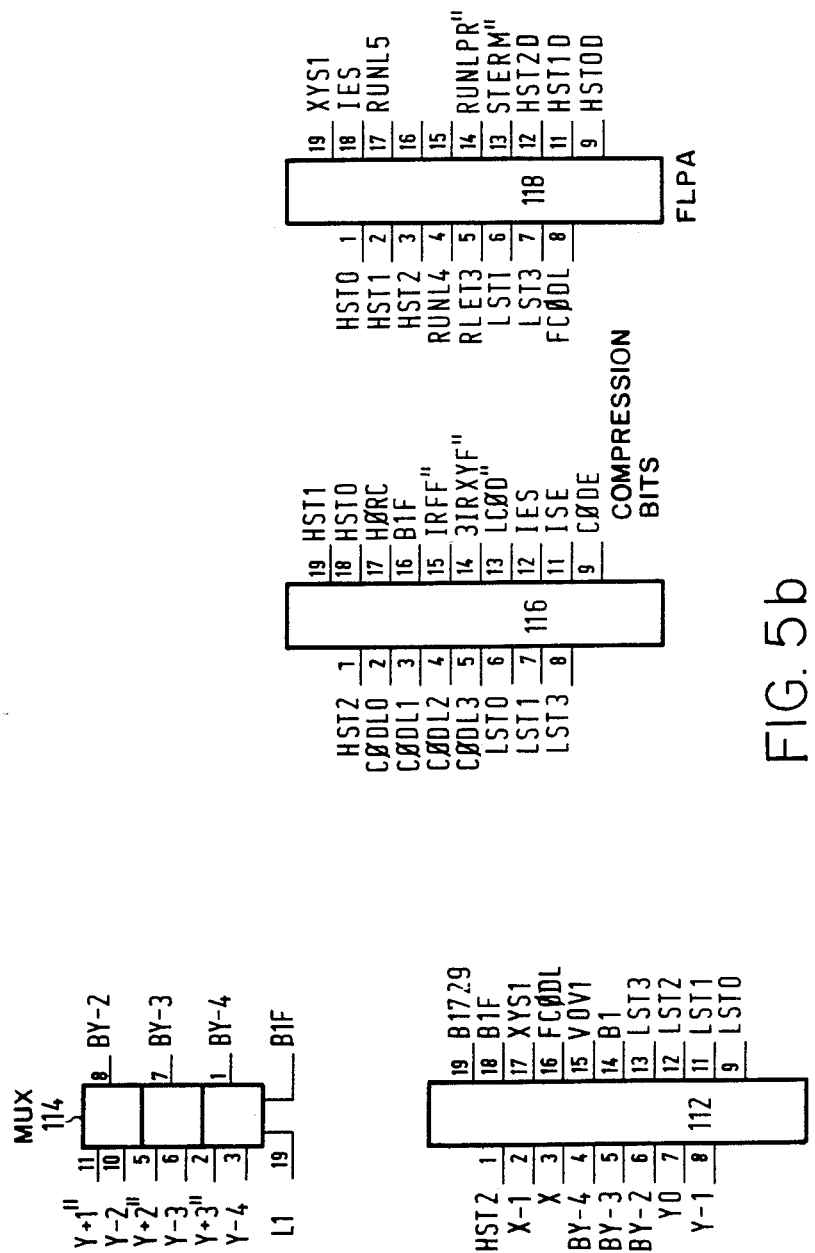

FIG. 5 shows a first section of a block diagram of the compression translator, that is to say the parts which provide the data input, the detection elements for a transition between binary black and binary white, and the control elements for the selection between a so-called horizontal code and a vertical code. Block 100 is a four-bit counter of the type S163 which is set to the position "3" at the beginning of a line and which counts the data bits shifted in. When the position "8" is reached, a sufficient number of data bits is present to undertake a first attempt to form a compression code. This may be repeated for each next data bit received. The position "11" is detected by the FPLA 102 in order to control the loading of a new data byte from the corresponding register (70 or 66 in FIG. 2). Subsequently, the latter registers are ready to receive the next data bytes (in time multiplex) via the bus 20 of Figrue 2. The synchronization (per 2) is determined by a 5 MHz clock frequency; the counter position appears on the pins 11-14; the pins 3-6, 10 recieve fixed signals high (H) and low (L1), and the pins 1, 7, 8 receive control signals yet to be described.

Element 102 is an FPLA unit of the type 82S153, make Signetics Corporation. It comprises exclusively combinatory logic elements and acts, in conjunction with the counter 100, as an input sequencer. This element thus receives the position of the counter 100 (4 bits), the signal "end of scanning line" (TCF) which is an external signal supplied by the DMA control unit as a control signal (in that case it is definitely necessary to generate the last code word of the relevant picture line), and the signal "LASTF" (inverted) which indicates the synchronization per picture line. Also received is an enable signal ISE (input shift enable) which enables the execution of shift operations on the data bits; the shifting in of the data bits and the shifting out of code bits is thus alternately performed. Also received is the signal HST2 (see FIGS. 3, 4) which acts to inhibit the generating of a vertical code. Also received is the signal RXYF (the suffix F means that the signal RXY has been buffered) which acts to indicate the presence of new data bytes in the registers 70, 66 of FIG. 2. Finally, there is received the signal CØMR which acts as a reset signal for starting a new page.

The output signals of FPLA 102 are the signal "LAST" which is presented again to the input after buffering (not shown), and the signals XYS0, XYS1 whose AND-function (not shown) controls the loading of the X and Y registers; XYS1 separately enables the shifting in these registers. The signal XYCLR controls the resetting of the X and Y registers. The signal RUNLR controls the presetting of the length of a one-colour series of data bits. Presetting to zero takes place at the beginning of a line because when the first data bit is black, a dummy series of white bits having the length zero must be formed; the counter 100 then automatically proceeds to position 3. Within the line the series length is preset to the position "1". The signal B1729 indicates, after the last data bit (1728) of a picture line, that this picture line has been completed. At the end of a line, the preset of the counter 100 returns to 0 (and subsequently to 3, unless there is a waiting condition). Thanks to the implementation of this signal B1729, the code words of successive picture lines are thus successively linked, without requiring fill bits without significance or end-of-line code bits (EØL). The signal ICNTLD controls the loading of the counter 100 to the position "8" after each data byte. The signal "3IRXYF" indicates (in inverted form) that a new data byte has been supplied under the control of the DMA control unit.

Elements 104, 106 are modules of the type 74LS323 and together they form the Y shift register 68 of FIG. 2. The data input (RYO-7) has a width of 8 bits; the data input also has a width of 8 bits numbered from Y−4 to Y+3. Corresponding elements 108, 110 form the X shift register 72 of FIG. 2. The data input (register 110) now has a width of 8 bits and the data output has a width of 2 bits (register 108), which means that only the data bits X-1 and X0 which are situated directly underneath the data bits Y-1 and Y0 are used. These two modules also receive the synchronizing clock frequency of 5 MHz (5MC), the signals XYS0Ø1, reset signals on pin 9. The input/output signals for the elements 108, 110 correspond to those for the elements 104, 106. Element 114 is a four-bit multiplexer for conduction either the four left or the four right bits from the register 104 to the further circuit under the control of the signal B1F from module 112. The latter indicates whether or not this FPLA has detected a "b1-transistion". If b1=1, the transition may possibly be situated in the bit position (y-4) to (y-1) inclusive. If b1=0, a b1-transition may still occur in the bit positions y0 through (y+3). The (inverted) buffering of the signals has been omitted for the sake of simplicity. Element 112 is and FPLA unit of said type 82S153 which indicates, on the basis of a number of data bits x−1, x and the multiplexed selection (y+1", y+2", y+3") or (y−2, y−3, y−4) and y0, y−1 from the shift registers 104, 108, whether or not a horizontal code is to be formed (so whether two of such codes must be formed in series). In the latter case the FPLA-unit forms a vertical code. Also received are the control signals B1F (buffered: there has been a b1-transition), FCØDL, XYS1, B1729 and HST2. The signals FCØDL and XYS1 in combination indicate that input data is available. The latter two signals have already been discussed; HST is received from element 118. The output code is presented on the four outputs LSTO-3 (line status). Also formed is the output signal B1 (b1-transition) which is presented on the input again after buffering. Element 116 is an FPLA unit of said type 82S153 and serves to output the actual compression bits on the output CØDE; consequently, this is a serial bit stream. The code is formed as code words whose length is between at least 1 bit and at the most 13 bits in accordance with said CCITT standard. For as long as such a code word is produced, the shifting of data bits into the shift registers 104 through 110 must be inhibited by an appropriate signal on output ISE; this signal is applied to the FPLA unit 102. For as long as a word is output, however, the buffer 9403 of FIG. 2 must be driven so that synchronization is obtained between on the one hand the serial shifting in of the compression bits and on the other hand the shifting together of bytes formed from such compression bits: IES. Finally, the FPLA unit 116 produces the pulse-shaped signals shown in the FIGS. 3, 4 in order to load the code bits and the bits representing the length of the code word into the shift registers/counters: LCØD.

To this end, the FPLA unit 116 receives a number of control signals. The signals LST0, LST1, LST3, B1 are received from the unit 112. The signals CØDL ... 3 are received from the element 138 in FIG. 6. The signals HSTO:2 have already been discussed and are supplied (with a small delay) by the element 118 (consequently HSTO:2D). The signal HORC is supplied by the element 137 of FIG. 6 and represents the current bit of a horizontal code word ("make-up" as well as "terminate"). The signal IRFF" indicates that the input register of the FIFO buffer is full, so that a stop must be made until the "fall-through" mechanism thereof is operative again. The signal 3IRXYF" is the position "3" (or "11") of the input counter (element 100) in the absence of new data bits; obviously, the supply of shift pulses to the data registers must then be temporarily stopped. The element 116 thus notably constitutes an output sequencer.

Element 118 is an FPLA unit of said type 82S153 and notably serves to output the status signals HST0, HST1, HST2 of the FIGS. 3, 4. To this end, this element first of all receives these three output signals themselves which are all set to zero at the beginning of a new line (the relevant intermediate buffering has been omitted for the sake of simplicity). Also received is the signal XYS1 from the element 102 (so that the shift registers 104-110 are also activated). The input signals B1, LST1, 3 are received from the element 112. The signals RUNL5, RUNL4, and RLET3 (from the element 122 in FIG. 6) indicate that the limit length for a one-colour series of data bits has been reached ($64=2^6$), so that a make-up code has to be formed. The signal FCØDL is formed by the element 138 in FIG. 6 where the position 15 of this counter has been reached. This bit enables the reception of the first data bit when the last code bit of a code word is output. The operation thus becomes slightly faster.

The element 118 also outputs two control signals. The signal "STERM" is used in the circuit of FIG. 6 and selects a "terminate" code. The signal RUNLPR is a preset signal for setting the counter for the series length of one-colour bits to the position "1" at the end of a code.

Figure 6:
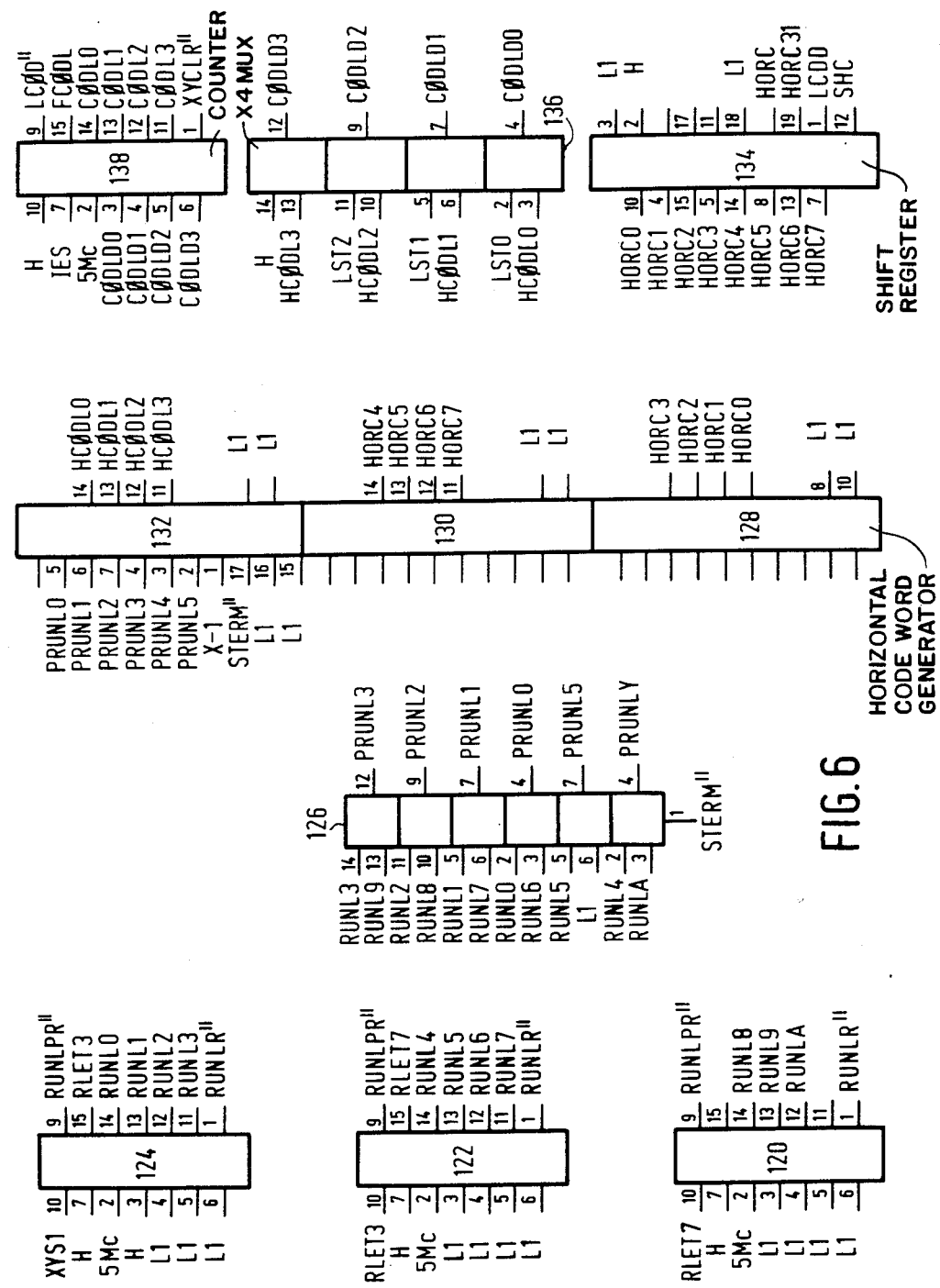

FIG. 6 shows a second section of a block diagram of the compression translator, that is to say the parts providing the counting of the number of successive black/white data bits in order to form the relevant horizontal code words therefrom. A standard picture line in the present embodiment consists of 1728 data bits plus 1 dummy bit, so that an 11-bit counter suffices to count down even the longest row of successive equivalent bits. The relevant counter consists of the elements 120, 122, 124 of the type 74S163, each of which forms a 4-bit counter, all elements being connected in series. Only 11 output bits RUNLO ... RUNLA are used for the further processing. The output carry signals RLET3, RLET7 are coupled through. The synchronization is obtained by means of the 5 MHz clock frequency. The signals RUNLR" (inverse) act as reset signals to zero as generated by the element 102 in FIG. 5 (at the beginning of a picture line). The signals RUNLPR" act as a load signal, generated by the element 118 of FIG. 5, in order to count a new series length of one-colour data bits as from the position 1 in the middle of a line after a code word has been shifted out (note the coincidence in time of the last code bit and the first data bit). The signal XYS1 forms the preload data (the signals RLET3, 7 have the value zero at that instant).

Element 126 is a six-bit multiplier (1½ module of the type 74LS257 multiplexer) for conducting two different selections of counter position bits. For a series of one-colour bits having a length of at the most 63, the counter position of the bits RUNL0 ... RUNL5 is conducted for direct encoding. For a series length in excess of 63, encoding is performed in two parts, that is to say on the one hand for the 5 most-significant bits (make-up code) and on the other hand, separately therefrom, for the 6 least-significant bits. The signal "STERM" derived from the element 118 in FIG. 5 acts as the selection signal.

Elements 128, 130, 132 form the actual generator for the horizontal code words. These elements are programmable read-only memories (PROM) of the type 82S137, make Signetics. Each element comprises ten outputs and four outputs. All these units receive the same signals, that is to say the conducted part of the counter position, PRUNLO . . . 5, the signal x−1 from the elemnet 108 in FIG. 6a which indicates whether the relevant horizontal code concerns a series of black bits or a series of white bits, and the signal "STERM" which indicates whether a so-called "make-up code word" is concerned or a so-called "terminal code word" (the input signals or the elements 128, 130 are not shown). As has already been stated, the length of a horizontal code word may vary between two and thirteen bits; it is a special aspect that code bits having the value "1" can occur only in the last eight code bits; for example, when the code word consists of 8+5 bits, the first 5 bits have the value zero in any case. The two elements 128, 130 thus together form the significant part of the code word (together at the most 8 bits) while the remaining bits always have the value zero. The element 132 indicates the length of the relevant code word in binary coded form.

The code bits formed by the elements 128, 130 are loaded into a shift register 134 of the type 74LS323. The length of the code word is applied to a guadruple multiplexer 136 of the type 74LS257. On its other series of inputs this multiplexer receives the three line status signals LSTO . . . 2 formed by the element 112 in FIG. 5. The output signals of the multiplexer 136 are loaded into a counter 138 of th type 74S163. The latter counts forwards under the control of the signal 5MC (per second) which is formed by the oscillator (not shown). Counting is enabled by the enable signal from the element 116 in FIG. 5 (IES). Loading is controlled by the signal "LC∅D" from the element 116 in FIG. 5. The signal C∅MR" acts as a reset signal. The data output signals of this counter ar C∅DL0-3 and the output carry signal is FC∅DL.

Figure 7:
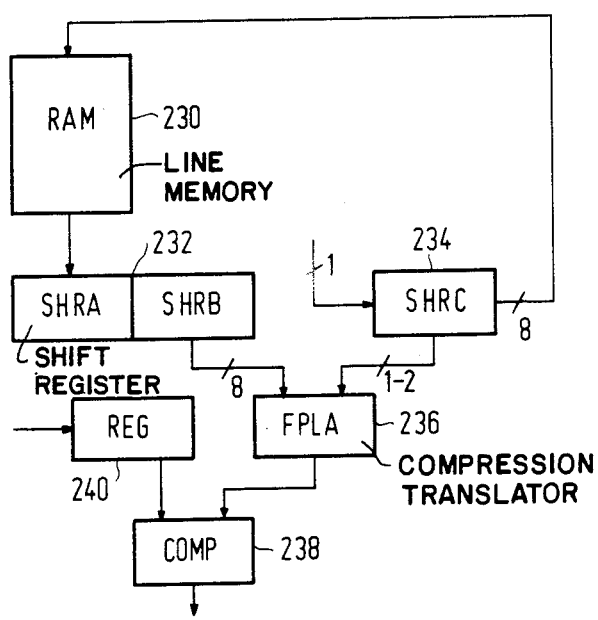
FIG. 7 shows a circuit diagram of a decompression device.

DESCRIPTION OF THE DECOMPRESSION DEVICE:

FIG. 7 shows a circuit diagram of a decompression device. Decompression comprises two sub-operations, that is to say first of all the recognition of a code word; the code words do not have a fixed length. Subsequently, the code word must be converted into the decompressed data, for example in order to enable the production of a hard copy of the picture. The principle used consists in that it is first of all assumed that the directly preceding picture line is known; therefore, for the first picture line this is the already discussed one-colour fiduciary zeroth line. Subsequently, pseudo-data bits are generated and compressed by way of the already described compression mechanism; this is done for each pseudo-data bit as if the next bit were the first one of a series having the other bit value. The code word thus formed is compared with the series of code bits received. In the case of correspondence, the emulated code word was the correct one and a change of colour is implemented as the next pseudo-data bit. For as long as no correspondence is found, no change of colour is implemented so that a series of one-colour data bits is output. The circuit of FIG. 7 is a circuit diagram so if forms part of an arrangement which is comparable to that of FIG. 2. Notably required is a picture memory for the storage of the decompressed data and in given circumstance a storage space for compression bits prior to the treatment may also be necessary (such storage may alternatively take place in the picture memory).

Element 230 is the line memory (at least 216 bytes). At the beginning of the decompression operation, the part used for the storage of the directly preceding picture line is reset to zero. A 16-bit shift register 232 having an 8-bit wide input and an 8-bit wide output is connected to the output of the memory 230. Element 234 is a shift register having a 1-bit wide series input, a 1 or 2-bit wide parallel output for the compression emulation, an 8-bit wide output for making the series of data bits formed available and for updating the memory 230 with thenew picture line. Element 236 is a compression translator constructed by means of FPLA units; the translator can operate in the same way as the previously described devide, the difference being that a code word is formed for each psudo-data bit received. Element 238 is a comparison element which each time compares the emulated code words with the sequence of code bits received and which inverts the sign of the series input signal for the shift register 234 in the case of "correspondance". The code bits for the comparison are received from the register 240.

Figures 8, 9:
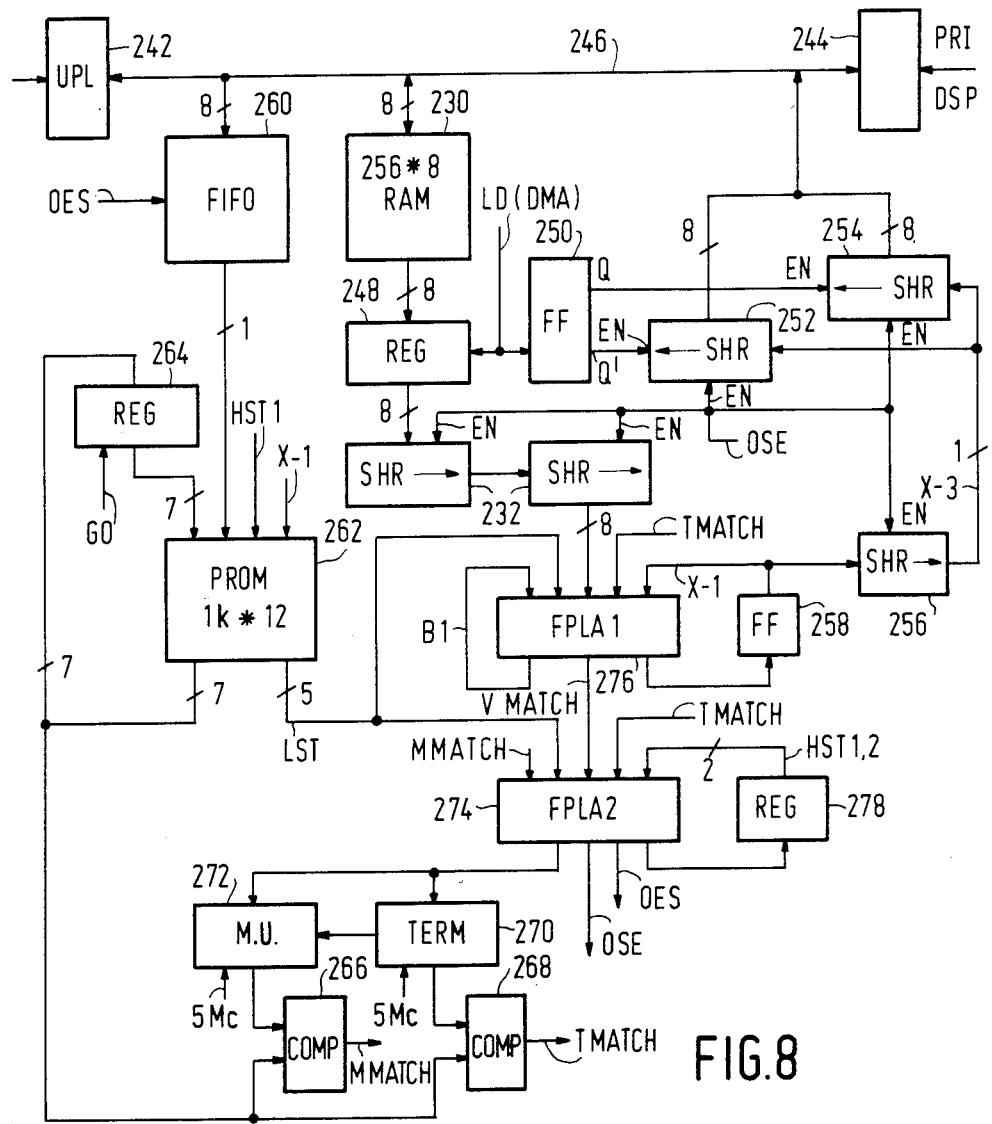
FIG. 8 shows a more detailed block diagram of a decompression device.
FIG. 9 shows an associated table with control signals.

FIG. 8 shows a more detailed block diagram of a decompression device. Element 246 is a bus of the already described type having a width of 8 bits. Element 242 is an interface circuit for a general purpose bus (FIG. 1). Element 244 is an interface circuit for a a display apparatus or a printer. Between the line memory 230 and the 16-bit shift register 232 there is included an 8-bit register 248 for adaptation purposes. This register receives the signal LOAD. Evidently, the transport between the elements 230 and 248 can take place via the bus by way of a DMA operation as described. For example, each time successive addresses of the memory 230 are then activated. The shift register 232 is activated by the signal OSE (output shift enable). The clock synchronization has been omitted for the sake of simplicity. The signal LOAD switches over the flipflop 250, so that only one of the two shift registers 252, 254 receives an enable signal EN. If, moreover, the signal OSE prevails, each time only one of these two registers can thus be filled. The data is supplied by a similar shift register 256, so that a FIFO-organization having a depth of two. bits is obtained. The series input of the shift register 256 is formed by the toggle 258 which each time changes its position once under the control of an activation signal. The element 234 of FIG. 7 is thus implemented. The function of the shift register 256 is, therefore, nothing but the formation of a time delay so that one of the shift registers 252/254 is always completely filled when the shift register 232 comprises eight free locations, so that it can receive a word from the memory; this is again performed by way of a direct memory access (DMA) operation.

Element 260 is a first-in-first-out memory which comprises a parallel input and a series output and which is fed by the bus 246 for the temporary storage of the compression bits. The signal OES acts as an enable signal for the serial output. The formation of this signal will be discussed herinafter. Element 262 is a programmable read-only (PROM) arrangement comprising a 10-bit wide input and a 12-bit wide output. It may consist of several separate modules in the described manner (see elements 128, 130, 132 of FIG. 6). The input signals are supplied by a 7-bit register 264, by FIFO 260 (1-bit); further control signals are the signal HST1 (from element 274) and (x−1) (the directly preceding current data bit from element 258). Each time when a compression bit is received, a 12-bit output word is formed and seven bits thereof are stored again in the input register 264. The relevant synchronization has been omitted for the sake of simplicty. This element thus constitutes the input sequencer.

FIG. 9 shows a table with control signals. The seven left-hand bits are stored in the register 264. The five right-hand bits constitute "real" control bits which notably indicate the mode of operation. The data of line 1 means that no code word has yet been recognized, so that one or more code bits must still be supplied before recognition can take place. The seven bits marked A then contain a part of the next address of the memory 262. When the first two bits of a new code are "00", no code word can be recognized yet. The next bit then provides the selection between a horizontal code (001) and a vertical code (000). After a start code word for a horizontal code, the colour (black and white) of the next series of one-colour bits is known. It can then be unambigously detected whether a "make-up" code word or a "terminate" code word appears. After the "terminate" code word, the same is applicable to the other colour. The seven bits "A . . . A" then control a path through a binary decision tree. The signal HST1 indicates the phase for a horizontal code (first or second part) and (x−1) indicates the current colour. The bits 4, 3, 2, 1 indicate a control code, and the bit "0" controls "stop" or "continue". In the case of a stop, no new data is stored in the register 264. Line 4 shows the output signal when the start code word (001) for a horizontal code ahs been recognized: in that case the operation is also continued (bit 0). Line 6 represents the situation when seven successive zeros have been recognized at the end of a page: again continuation.

Line 2 indicates that a code word for a make-up code has been found: all cases for which the bit "0" has the value "1" indicate "stop". The implementation is performed in that this bit is recognized by the FPLA 274 and a relevant control signal is applied to the register 264. The length of the make-up code is indicated by the five bits M, that is to say in units of 64 bits. Line 3 indicates that a code word for a "terminate" code has been found: bit 5 now has the value 0 and the six bits T indicate the length of the series of data bits formed as the "terminate" code. The largest length is "111111". Line 5 indicates that a code word for a vertical code has been detected. The bits "LLL" indicate which of the 8 different vertical code words is concerned. Line 8 indicates that the eighth zero has been detected at the end of a page. Consequently, at the end of a page the shift-out mechanism remains operative to enable presentation of the last data bytes of the current picture line on the output. The bit length represented by the bits "PPPPP" (to be counted down) must be sufficient for this purpose; usually, "19" suffices (2×8+3), but alternatively a higher value may be chosen.

Referring to FIG. 8 again, the seven bits (B . . . 5) are applied from the read-only memory 262 to the comparison elements 266, 268, at the most one of which is active under the control of bit 5. Elements 270, 272 form two counters which count how many data bits are contained in a one-colour series. The synchronization is performed by means of said 5 MHz frequency; counting is performed in synchronism with the output of the data bits in the shift register 256. Upon decompression, first the "make-up code" appears. The counter 272 is activated by the output carry signals of the counter 270. When the maximum count of the make-up code is reached, the comparison element 266 outputs the signal MMATCH. Consequently, the FPLA unit 274 outputs the signal OES in order to enable the serial output of FIFO 260 (the "0" bit of the read-only memory 262 indicates control signals which terminate this signal OES again). When the maximum count of the make-up code is reached or when no make-up code is necessary, the series length of one-colour bits is compared in comparison element 268 with the relevant series length from the read-only memory 262. When the maximum count of this length is reached, the signal TMATCH appears. This signal is applied to the FPLA element 274, so that either the second "make-up" possibly plus "terminate" code words are searched again, or a search is made for a new vertical or horizontal code.

Further control is performed by the FPLA units 274, 276 of th described type. The FPLA unit 276 receives the signals LST which indicate whether a code word has been recognized, or whether a vertical code word, a make-up code word, a terminate code word or a special code word (page ready) is concerned. The decoding over 5 bits facilitates the further control. The unit 276 also receives the current (=last generated) data bit (x−1), the eight data bits of the directly preceding line from the shift register 232, the signal B1 and the already described signal TMATCH. The signal B1 indicates whether a "b1-transition" has been found. This signal is generated by the FPLA unit 276 itself and is buffered in the register 278 (the relevant connections have been omitted for the sake of simplicity). The signal TMATCH is formed by the comparison element 268 and indicates that a colour transition must be formed. The FPLA unit 276 serves to form a vertical code word and to compare it with the vertical code word received. Thanks to the choice of this module, this comparison is not explicitly performed. When a correct vertical code word is found and also when the signal TMATCH is received, the flipflop 258 is switch over in order to change the colour. When a correct vertical word is found (which matches the emulated data), the signal VMATCH is output.

The FPLA unit 274 receives the signals LST from the read-only memory, and also the signals TMATCH, MMATCH and VMATCH and the signal HST1, 2. The output signals are OES, OSE, RESET, HST1, 2. The signal OES controls the FIFO 260, so that new code bits can be serially supplied. The signal OSE controls the shift registers 232, 252, 254, 256, so that each time one data bit is emulated. Consequently, OSE and OES are mainly alternately active. The signal RESET resets the counters 270, 272 to zero each time when there is a new series length of one-colour data bits to be counted. The signals HST1, 2 have already been discussed in the direction of the compression operation.

The shift registers 252, 254, 256 serve for the storage of the emulated data bits. The shift register 256 only serves as a delay element; the output signal is the data bit (x−3) and this delay corresponds to that introduced during the compression operation in order to enable the generating of the first code word only after the arrival of a few data bits. The shift registers 252, 254 form a FIFO organization having a depth of two bits.

What is claimed is:

1. In a system for line-wise compressing and decompressing a picture field which is made of a plurality of rows and columns of pixel data, a compression device comprising:
   a first input for receiving said picture field pixel data;
   a read/write memory organized on a word basis connected to store at least a line of said pixel data received from said first input;
   a first shift register coupled to receive a row of said pixel data from said first input;
   a second shift register connected to receive pixel data from said read/write memory which, during a memory cycle with said first register, receives the preceding row of pixel data having the same column position as said first register data;
   a compression translator connected to said first and second shift registers, said compression translator generating from line pixels received from said first and second shift registers a series of compression bits, successive lines of pixel data generating successive groups of compression bits which have neither fill bits nor end of line bits; and,
   a series to parallel converting buffer fed through a first input by said compression translator, and buffer having a dynamic second input and output for communicating with a parallel local communication bus.

2. A system as claimed in claim 1, further comprising a decompression device which comprises a third input for receiving the compression bits, a second, word-wise organized read/write memory for accommodating at least the binary pixel data of a complete picture line, a third shift register with a parallel input and a parallel output for storing, during a second memory operation, a third series of data bits of a directly preceding picture line from the second read/write memory addressed by a third address, and for presenting said third series, by way of second shift control of the third shift register, to a decompression translator, a third output of the decompression translator connected to the series input of a fourth shift register to present thereto a series of data bits of a current picture line, and to present said series of data bits to the decompression translator on an output of the fourth shift register, said fourth shift register also comprising a parallel output for writing, during said second memory operation, a fourth series of data bits of the current picture line back into the second read/write memory, said second read/write memory addressed by a fourth address which occupies a fixed relative position with respect to the third address, a code word recognizer which comprises a parallel/series converting input element and an end-around coupled sequencer for signalling the recognition of a code word to the decompression translator; a second sequential logic element which comprises at least two states in order to activate said parallel/series converting input element in a third state until a code word has been recognized and to activate said second shift control in a fourth state in reaction thereto until a series of data bits in agreement with the group of significant compression bits of the code word thus recognized has been presented to said fourth shift register.

3. A decompression device as claimed in claim 2, wherein a counting element is provided for counting the data bits presented to said fourth shift register after the recognition of a horizontal code, and a comparison element for comparing the counting sum with a counting sum of a "make-up" or a "terminate" code word which is translated by the code word recognizer from a horizontal code word upon recognition thereof.

4. A decompression device as claimed in claim 3, wherein said fourth shift register has a first-in-first-out organization, the parallel output thereof being connected to a second communication bus together with the second read/write memory.

5. A system as claimed in claim 1 wherein each successive group of compression data indicates a transistion between a black pixel and an adjacent white pixel in a line of pixel data.

6. A system as claimed in claim 5, wherein during the processing of the first line of the picture field a one-colour fiduciary zeroth line is presented to the compression translator.

7. A compression device for use in a system as claimed in claim 5 wherein said memory cycle is a read-before-write operation under direct-memory access (DMA) control.

8. A scanning device for a document, comprising a compression device as claimed in claim 7, further comprising a picture buffer which is fed by a scanning element in order to accommodate all data of a picture field before further processing.

9. A compression device as claimed in claim 5, wherein there is provided a sequential logic element which has at least two states in order to activate the shift control (ISE) of said first and second shift register in a first state until a group of significant compression bits has been formed, to deactivate in reacation thereto said shift control in a second state, to activate said first output (IES) until said group of significant compression bits has been presented compltely on said first output, and to return in reaction thereto to said first state.

10. A compression device as claimed in claim 9, wherein said second state has a substate in order to enable, together with the presentation of a last code bit of group of significant compression bits, the shift control of the next data bit.

11. A compression device as claimed in claim 9, wherein said compression translator comprises programmable logic array means for receiving the information of at least two pixels (x, x−1) of the actual line, of at least two pixels in corresponding positions on the directly preceding line (y, y−1), and of at least three further adjacent pixels (BY−2, BY−3, BY−4) on the same directly preceding line, said programmable logic array means having first generating means for generating transistion-dependent pixel line status signals (LSTO:3), second generating means for receiving said pixel line status signals, and being coupled by a hold element for constituting an end around sequencer and generating horizontal code status signals, and code word rest length signals (C∅DLO:3) which are generated by a counter to generate the group of compression code bits as output signals.

12. A compression device as claimed in claim 11, wherein said counter is a code word rest length counter, fed by a two-input-one-output multiplexer, said multiplexer being fed by code word rest length signals (HC∅DLO:3) from said counter and by the line status signals (LSTO:2), the code word rest length counter having at least one position for therein advancing the compression translator while outputting a fill bit within the relevant code word.

* * * * *